G. H. CAMBRIDGE.
PEDAL MECHANISM.
APPLICATION FILED OCT. 4, 1917.

1,260,323.

Patented Mar. 26, 1918.
2 SHEETS—SHEET 1.

Witnesses

Inventor
George H. Cambridge.
By Joshua R. H. Potts
his Attorney

G. H. CAMBRIDGE.
PEDAL MECHANISM.
APPLICATION FILED OCT. 4, 1917.
1,260,323.
Patented Mar. 26, 1918.
2 SHEETS—SHEET 2.
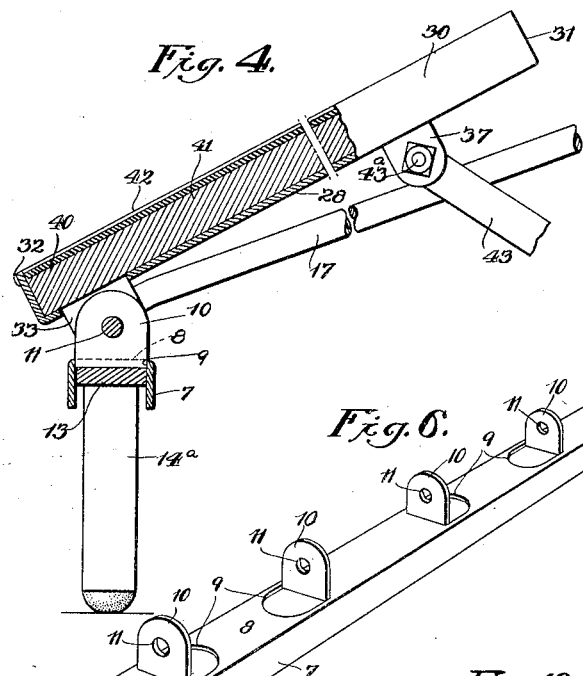
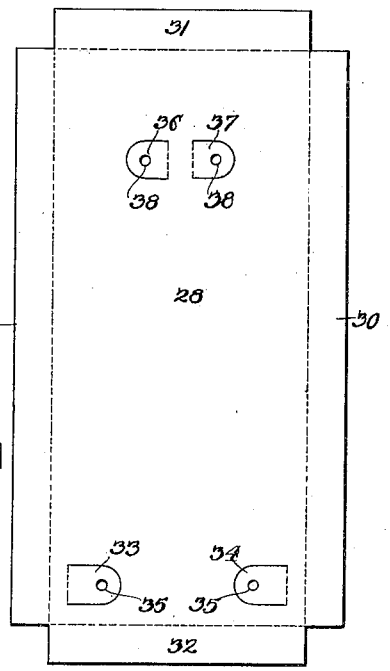
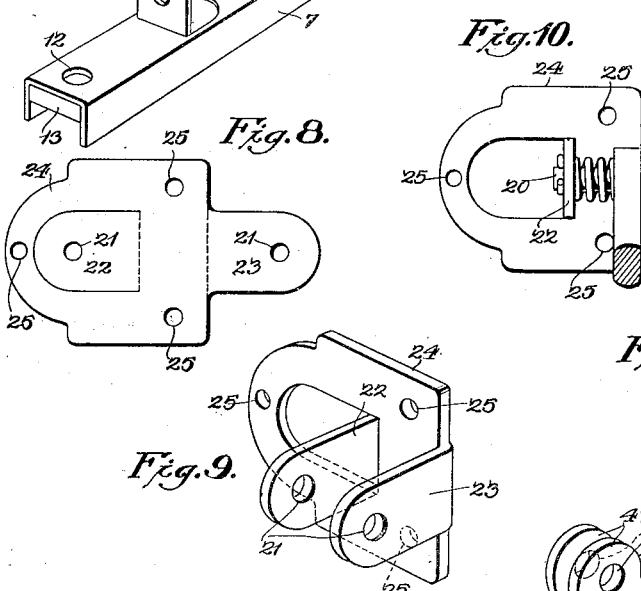
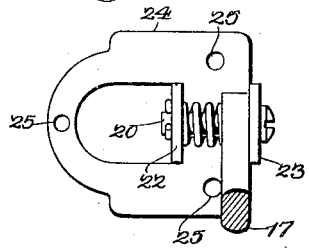
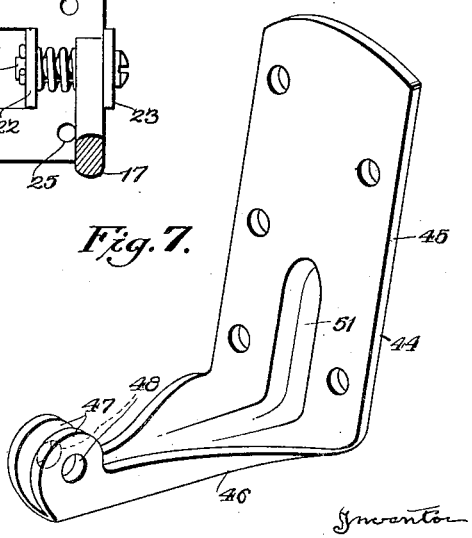
Witnesses
H. Harwood.
E. E. Reinhart.
Inventor
George H. Cambridge
By Joshua R. H. Potts
His Attorney

UNITED STATES PATENT OFFICE.

GEORGE H. CAMBRIDGE, OF PARKERSBURG, PENNSYLVANIA.

PEDAL MECHANISM.

1,260,323. Specification of Letters Patent. Patented Mar. 26, 1918.

Application filed October 4, 1917. Serial No. 194,745.

*To all whom it may concern:*

Be it known that I, GEORGE H. CAMBRIDGE, a citizen of the United States, residing at Parkersburg, in the county of Chester and State of Pennsylvania, have invented certain new and useful Improvements in Pedal Mechanism, of which the following is a specification.

One object of my invention is to provide a pedal mechanism which will be particularly adapted for operating automatic pianos and which will be light in weight so that it can be easily folded into an inoperative position when it is not desired for use.

Another object is to so construct my invention that it will be easy of operation, durable, and will be practically noiseless.

A still further object is to so construct my invention that it can be quickly and cheaply manufactured.

These objects, and other advantageous ends which will be described hereinafter, I attain in the following manner, reference being had to the accompanying drawings in which—

Fig. 4 is an enlarged, sectional view taken on the line 4—4 of Fig. 2.

Fig. 5 is a face view of a sheet metal blank forming a part of the pedal construction.

Fig. 6 is a perspective view of a foot bar forming a part of my invention.

Fig. 7 is a perspective view of a bellows bracket made in accordance with my invention.

Fig. 8 is a face view of a sheet metal blank which forms an attaching member to the piano frame.

Fig. 9 is a perspective view of the attaching member shown in Fig. 8 when bent into shape.

Fig. 10 is a face view, partly in section showing a connecting rod joined to the attaching member.

Figure 1:
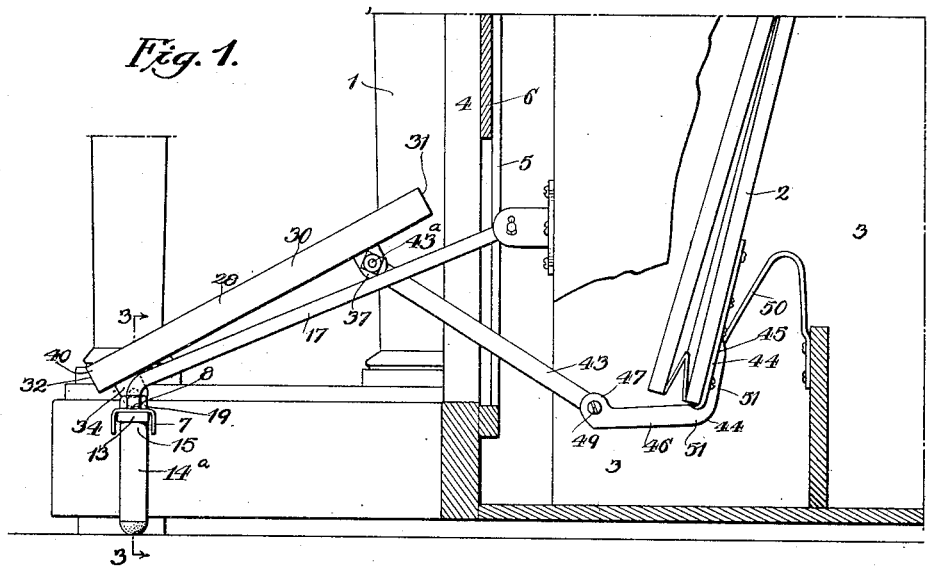
Figure 1 is a fragmentary, side elevation of a piano, partly in section showing my invention connected thereto.

Referring to the drawings, 1 represents a piano casing including a bellows 2 within a chamber 3. The front 4 of the casing has an opening 5 which can be closed with a slidable panel 6 such as used in a number of automatic pianos now in common use.

A foot bar 7 is made of malleable sheet metal pressed or otherwise bent into the shape clearly illustrated in Fig. 6 and which is channel shape in cross section. The upper surface 8 of this foot bar 7 is cut at 9 to provide ears 10 which are bent upwardly at right angles to the surface 8. These ears have holes 11 and the cutting 9 and holes 11 can be done simultaneously by dies. Holes 12 are also cut adjacent opposite ends of the foot bar 7 and these holes may be punched at the same time as the holes 11 and cutting 9 are made.

A bearing and reinforcing bar 13 is designed to be positioned within the channel of the foot bar 7 and has holes 14 which register with the holes 12 in the foot bar 7. Legs 14$^a$ have their upper ends 15 in engagement with the lower surface of the bearing bar 13 and are provided with tapped holes 16. A pair of securing bars 17 have threaded ends 18 which pass through the holes 12 and 13 and into engagement with the tapped holes 16 in the legs 14$^a$. Locking nuts 19 on the securing bars 17 engage the upper surface 8 of the foot bar 7 and serve to bind the legs, the securing bars, and the foot bar together. The opposite ends of the securing bars 17 are pivotally mounted on pins 20. Each pin 20 fits within holes 21 on lips 22 and 23 which project outwardly from and form a part of a bracket 24. Each securing bar 17 is positioned between the respective lips 22 and 23 and a coiled spring is interposed between the inner surface of the lip 22 and the adjacent face of the respective bar 17, as clearly shown in Fig. 10. The brackets 24 are made by stamping or otherwise cutting sheet metal in the blank form as shown in Fig. 8 and afterward bending the lips 22 and 23 into the position shown in Fig. 9. The brackets 24 are provided with holes 25 so that screws may be used to secure these brackets to the piano casing 1, as clearly shown in Figs. 1 and 2.

Each pedal 26 has a frame 27 which is made by stamping a piece of sheet metal 28 as shown in Fig. 5. A blank is thus produced which includes side flanges 29 and 30 and end flanges 31 and 32. Ears 33 and 34 are also stamped in the blank and have holes 35. Two other ears 36 and 37 are cut in the blank and are provided with holes 38. The flanges 29 to 32 inclusive are bent upwardly and the ears 33 to 37 inclusive are bent outwardly. When thus bent, the ears 33 and 34 embrace the respective pairs of ears 10 on the foot bar 7, as clearly shown in Figs. 2 and 3. The holes in all of the ears 10, 33, and 34 are in register and a pivot rod 39 extends through the ears and forms a pivotal connecting means for the forward ends 40 of the pedals to the foot bar. The flanges 29 to 32 of the blanks 28 being bent upwardly form receptacles in which filling blocks 41 are mounted and these filling blocks are faced with rubber treads 42.

The ears 36 and 37 have bolts 43ª extending therefrom and forming the pivotal connection for connecting rods 43. Brackets 44 are connected to the respective bellows 2 and these brackets are made of malleable sheet metal and are pressed into the shape shown in Figs. 1 and 7. The upper leg 45 of each bracket 44 is substantially flat and is bent at an angle to the lower leg 46. The lower leg 46 has its edge portions turned upwardly and is provided with lugs 47 having holes 48 which when bent into the position shown in Fig. 7 register with each other and permit the insertion of a pivot screw 49 which connects the inner ends of the connecting rods as illustrated in Fig. 1. The bellows 2 can be normally held in their outward positions by means of springs 50 or by any other suitable means since the construction of the latter does not form a part of my invention.

Figure 2:
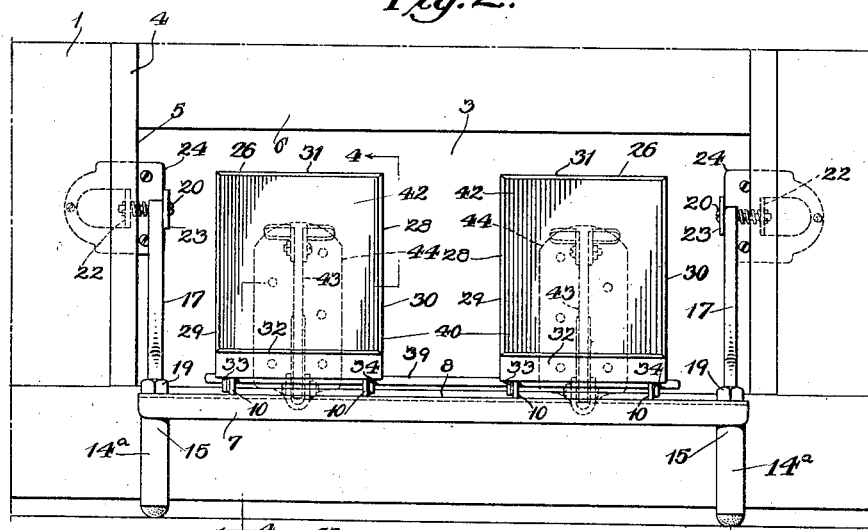
Fig. 2 is a front view of Fig. 1 showing all the parts in outside view.
Figure 3:
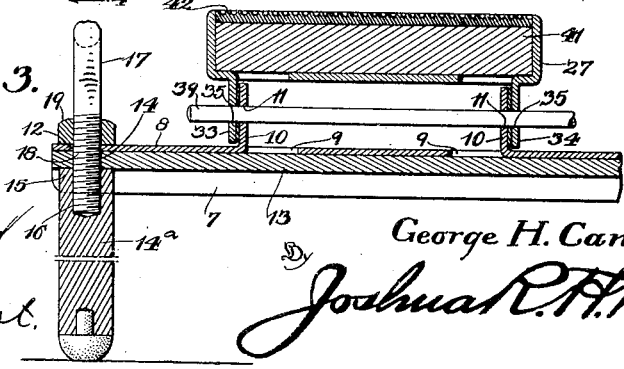
Fig. 3 is an enlarged, fragmentary view taken on the line 3—3 of Fig. 1.

The brackets 44 by bending them into the shape above described are greatly strengthened and I add to this strength by providing a corrugation 51 which extends part way up the leg 45 and downwardly around the bend into the leg 46. By forming elements out of sheet metal and pressing them into the shape as illustrated an extremely durable and strong construction is provided and one which can be quickly made and assembled. Furthermore the construction is comparatively light in weight so that it can be quickly folded into an inoperative position within the piano casing 1 or unfolded into operative position as illustrated in Figs. 1 and 2.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. Pedal mechanism of the character described including a foot bar having ears cut therein and bent into angular positions, a pedal having a frame of sheet material and including ears which are cut and bent into angular positions, and means pivotally connecting the ears of said pedal and foot bar, substantially as described.

2. Pedal mechanism of the character described including a foot bar having ears projecting therefrom, a pedal including a frame cut from a blank of sheet material and including flanges bent upwardly and ears bent downwardly, a tread interposed between said flanges, and a pivot member connecting the ears on said foot bar with the ears on said frame, substantially as described.

3. Pedal mechanism of the character described including a foot bar having ears projecting therefrom, a pedal including a frame cut from a blank of sheet material and including flanges bent upwardly and ears bent downwardly, a tread interposed between said flanges, a pivot member connecting the ears on said foot bar with the ears on said frame, other ears cut in and bent outwardly from said frame, a bellows bracket, and means pivotally connecting said latter ears with the bellows bracket, substantially as described.

4. Pedal mechanism of the character described including a foot bar having ears projecting therefrom, a pedal including a frame cut from a blank of sheet material and having flanges bent upwardly and ears bent downwardly, a tread interposed between said flanges, a pivot member connecting the ears on said foot bar with the ears on said frame, said frame having ears cut in and bent outwardly therefrom, a bellows bracket made of pressed sheet metal having angularly disposed legs one of which is adapted to be secured to a bellows, the other having edge portions turned up and provided with lugs, said lugs having holes therein registering with each other, a rod pivotally connecting said latter mentioned ears and having a portion extending between said lugs, and a pivot member extending through the holes in said lugs and connected to said connecting rod, substantially as described.

5. Pedal mechanism of the character described including a foot bar having ears projecting therefrom, a pedal including a frame cut from a blank of sheet material and having flanges bent upwardly and ears bent downwardly, a tread interposed between said flanges, a pivot member connecting the ears on said foot bar with the ears on said frame, said frame having other ears cut in and bent outwardly therefrom, a bellows bracket made of pressed sheet metal having angularly disposed legs one of which is adapted to be secured to a bellows the other having edge portions turned up and provided with lugs, said lugs having holes therein registering with each other, a rod pivotally connecting said latter mentioned ears and having a portion extending between said lugs, and a pivot member extending through the holes in said lugs and connected to said connecting rod, said bellows bracket being corrugated, said corrugation extending into both legs of the bracket, substantially as described.

6. Pedal mechanism of the character described including a foot bar, pedals operatively connected with said foot bar, securing bars attached to said foot bar, a securing bracket having lips spaced apart, a pivot member extending through said lips and forming a pivotal connection for said securing bar, and a spring adapted to keep said securing bar into engagement with one of said lips, substantialy as described.

7. Pedal mechanism of the character described including a foot bar, pedals operatively connected with said foot bar, securing bars attached to said foot bar, a securing bracket made from sheet material having lips cut therein and bent into angular positions, a pivot member extending through said lips and forming a pivotal connection for said securing bar, and means for holding said securing bar in engagement with one of said lips, substantially as described.

In testimony whereof I have signed my name to this specification in the presence of two subscribing witnesses.

GEORGE H. CAMBRIDGE.

Witnesses:
MARY A. INGLAR,
CHAS. E. POTTS.

Copies of this patent may be obtained for five cents each, by addressing the "Commissioner of Patents, Washington, D. C."